(12) United States Patent
Roh

(10) Patent No.: US 7,719,237 B2
(45) Date of Patent: May 18, 2010

(54) WIRELESS COMMUNICATION TERMINAL AND BATTERY PACK FOR THE SAME

(75) Inventor: Ji Won Roh, Gunpo-si (KR)

(73) Assignee: LG Electronics Inc., Seoul (KR)

(*) Notice: Subject to any disclaimer, the term of this patent is extended or adjusted under 35 U.S.C. 154(b) by 467 days.

(21) Appl. No.: 11/250,803

(22) Filed: Oct. 13, 2005

(65) Prior Publication Data

US 2006/0076932 A1 Apr. 13, 2006

(30) Foreign Application Priority Data

Oct. 13, 2004 (KR) ...................... 10-2004-0081823

(51) Int. Cl.
*H02J 7/16* (2006.01)
(52) U.S. Cl. ...................... 320/150; 320/153
(58) Field of Classification Search ................ 320/134, 320/114, 135, 136
See application file for complete search history.

(56) References Cited

U.S. PATENT DOCUMENTS

| | | | | |
|---|---|---|---|---|
| 4,544,910 A | * | 10/1985 | Hoberman | 340/333 |
| 4,636,705 A | * | 1/1987 | Bowman | 322/28 |
| 5,352,966 A | * | 10/1994 | Irons | 320/103 |
| 5,963,019 A | * | 10/1999 | Cheon | 320/150 |
| 6,075,343 A | * | 6/2000 | Hsu | 320/134 |
| 6,577,104 B2 | * | 6/2003 | Sakakibara | 320/132 |
| 6,605,922 B2 | * | 8/2003 | Tamai et al. | 320/106 |
| 6,891,353 B2 | * | 5/2005 | Tsukamoto et al. | 320/136 |
| 7,002,265 B2 | * | 2/2006 | Potega | 307/149 |
| 7,332,893 B2 | * | 2/2008 | Nguyen et al. | 320/134 |
| 2004/0065536 A1 | * | 4/2004 | Takiagwa | 200/566 |
| 2004/0232889 A1 | * | 11/2004 | Sudo et al. | 320/149 |

FOREIGN PATENT DOCUMENTS

| | | |
|---|---|---|
| CN | 1192072 A | 9/1997 |
| CN | 2523032 Y | 11/2002 |
| JP | 2003-197268 | 7/2003 |
| KR | 1020010036801 A | 5/2001 |
| WO | WO 02/35618 A1 | 5/2002 |

* cited by examiner

*Primary Examiner*—Bao Q Vu
*Assistant Examiner*—Nguyen Tran
(74) *Attorney, Agent, or Firm*—Lee, Hong, Degerman, Kang & Waimey

(57) ABSTRACT

A wireless communication terminal and a battery pack for the same are disclosed. The wireless communication terminal includes a battery pack having one or more battery cells supplying power to the terminal, wherein the battery pack includes a protective circuit senses an high temperature or pressure condition of the one or more battery cells and disconnects battery power from the terminal circuitry.

19 Claims, 4 Drawing Sheets

(Front view of battery pack)

US 7,719,237 B2

WIRELESS COMMUNICATION TERMINAL AND BATTERY PACK FOR THE SAME

CROSS-REFERENCE TO RELATED APPLICATIONS

Pursuant to 35 U.S.C. §119(a), this application claims the benefit of earlier filing date and right of priority to Korean Patent Application No. 10-2004-0081823, filed on Oct. 13, 2004, the content of which is hereby incorporated by reference herein in its entirety.

FIELD OF THE INVENTION

The present invention relates to a wireless communication terminal ("terminal") and a battery pack for the same, and more particularly, to a terminal and a battery pack for the same in which a protective circuit is provided to control a power source supplied to the terminal depending on a temperature inside the battery pack.

BACKGROUND OF THE INVENTION

FIG. 1 is an exemplary view illustrating a related art terminal having a battery, wherein the terminal 10 is directly connected with a battery 20 without any device that checks conditions of the battery 20. The battery 20 has a protective circuit therein to protect generally against an overcharge, overdischarge and a short circuit. In case of overcharge and overdischarge, the protective circuit detects a voltage of the battery 20 and compares the detected voltage with a reference voltage using a comparator. If the detected voltage of the battery 20 is more or less than the reference voltage, the protective circuit may disconnect the battery power from the terminal circuitry. Also, if a current flowing in an internal resistor inside the battery 20 is greater than a reference current, the protective circuit recognizes the battery 20 as having a short circuit, and also disconnects the battery power from the circuitry.

However, there is no sensor to detect an expansion of the battery 20 that may cause battery fluid to leak, or an abnormally high battery temperature. Because these conditions are not detected, the battery power continuously connected to the terminal circuitry potentially causing a dangerous situation such as an explosion thereby placing a user in danger.

SUMMARY OF THE INVENTION

Accordingly, the present invention is directed to a wireless communication terminal and a battery pack for the same that substantially solves one or more problems due to limitations and disadvantages of the related art.

An object of the present invention is to provide a terminal and a battery pack for the same, in which the terminal circuitry is prevented from being damaged by overheating of the battery pack.

Another object of the present invention is to provide a terminal and a battery pack for the same in which a user of the terminal is protected from injury by an overheated of the battery pack.

Yet another object of the present invention is to provide a terminal and a battery pack for the same, in which the battery is disconnected from the terminal circuitry when the battery pack has an alarm condition.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a battery pack for a wireless communication terminal includes one or more battery cells, and a protective circuit controlling the power from the one or more battery cells to the terminal depending on the internal temperature of the battery pack.

In another aspect of the present invention, a battery pack for a wireless communication terminal includes a battery cell, and a protective circuit controlling the power supplied from the battery cell to the depending on the internal pressure of the battery pack.

The terminal battery pack is characterized in that the protective circuit includes a pressure and a temperature sensor for sensing the internal pressure and temperature of the battery pack, and a switching transistor for controlling the power from the one or more battery cells to the terminal circuitry, the switching transistor being responsive to the temperature sensor. The switching transistor may be a metal oxide semiconductor field effect transistor (MOSFET).

The terminal battery further includes a buzzer and a light emitting diode (LED) for indicating an alarm condition.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE EMBODIMENTS

Reference will now be made in detail to the embodiments of the present invention, examples of which are illustrated in the accompanying drawings. Wherever possible, the same reference numbers will be used throughout the drawings to refer to the same or like parts.

A terminal and a battery pack for the same along with their operations will be described with reference to the accompanying drawings.

Figure 1:
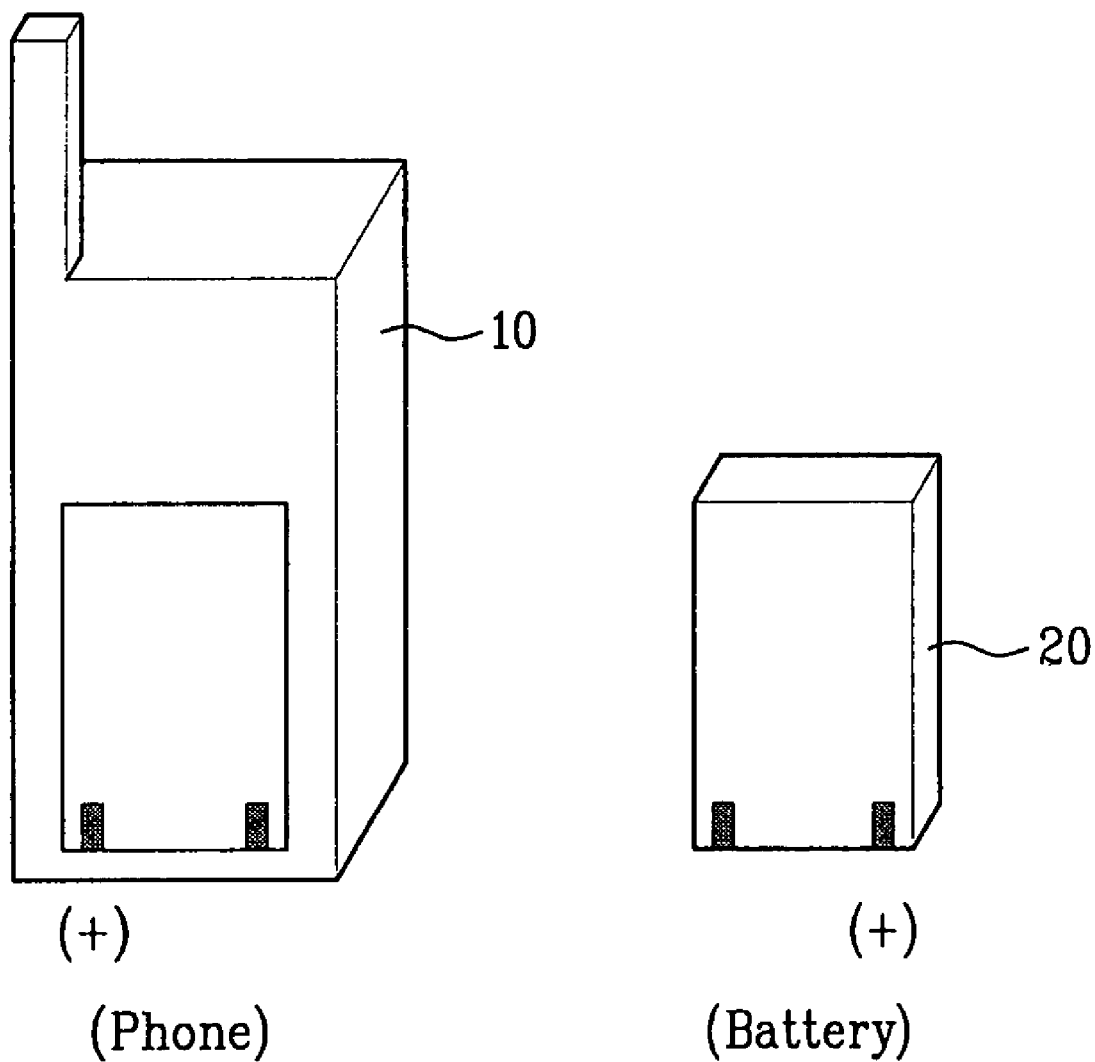
FIG. 1 is an exemplary view illustrating a related art wireless communication terminal into which a battery is assembled.
Figure 2:
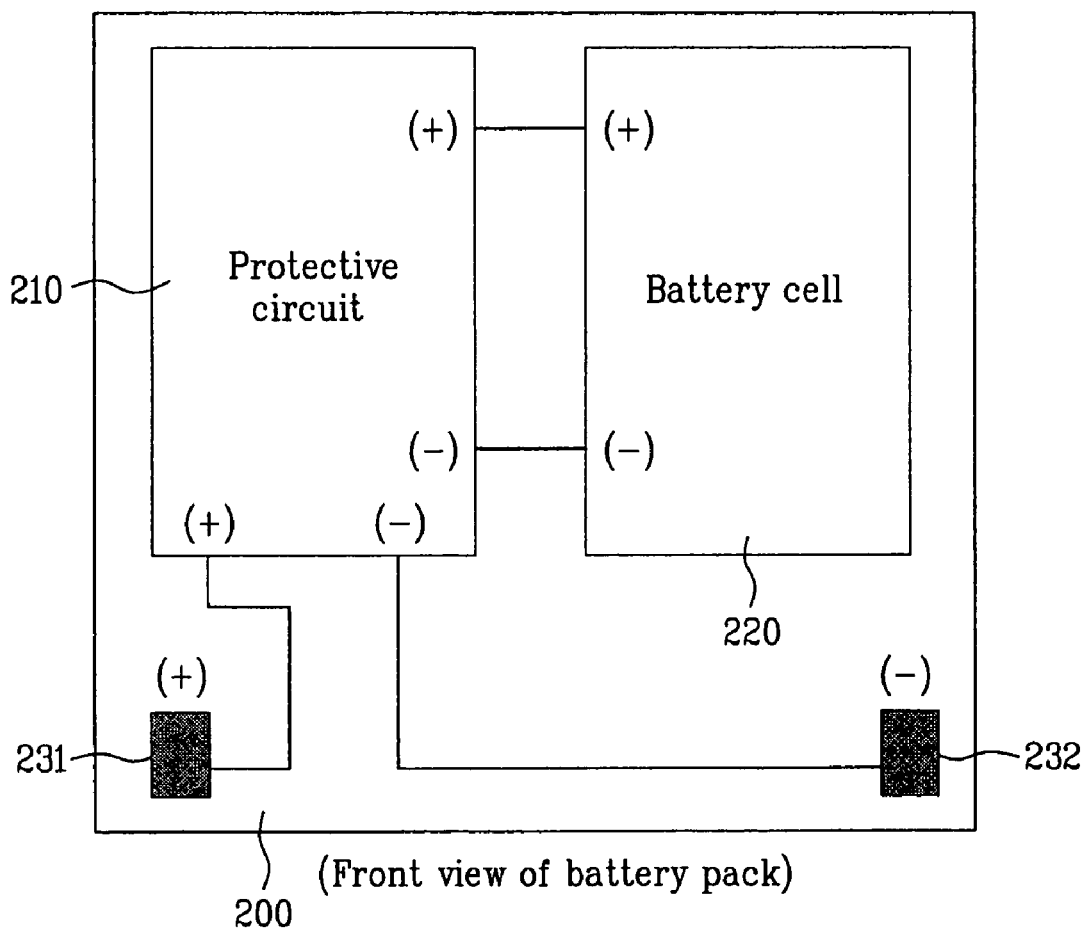
FIG. 2 is an exemplary view illustrating a battery pack according to one embodiment of the present invention.

FIG. 2 is an exemplary view illustrating a battery pack according to one embodiment of the present invention. As shown in FIG. 2, a battery pack 200 includes a protective circuit 210 and one or more battery cells 220. In other words, power supplied from the battery cell 220 is not directly transmitted to contacts 231 and 232 but transmitted thereto through the protective circuit 210.

Figure 3:
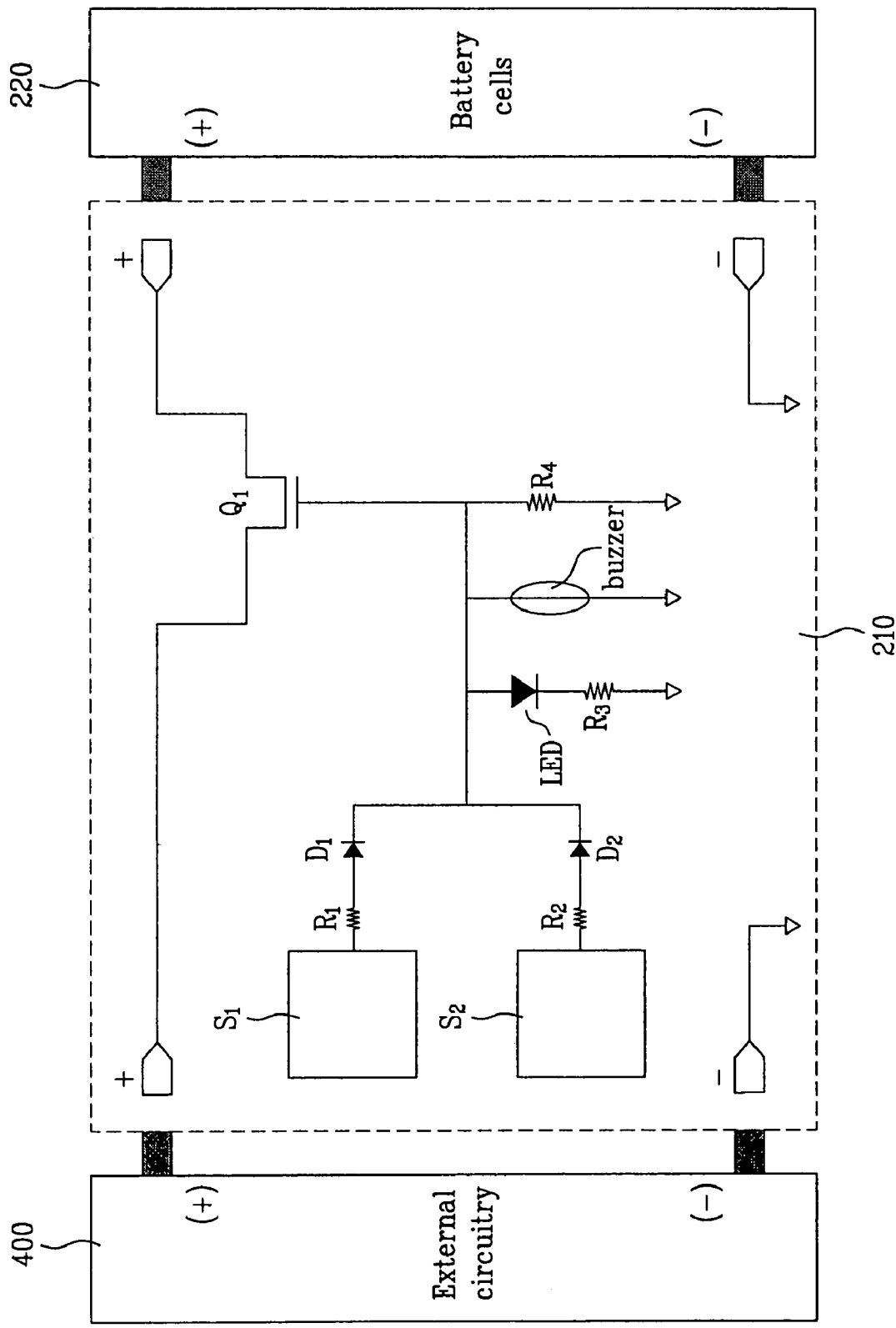
FIG. 3 is a circuit diagram illustrating a protective circuit according to one embodiment of the present invention.

FIG. 3 is a circuit diagram illustrating the protective circuit according to one embodiment of the present invention. Referring to FIG. 3, the protective circuit 210 according to the present invention includes a pressure sensor S1, a temperature sensor S2, a first resistor R1 and a second resistor R2, first and second diodes D1 and D2, a light emitting diode (LED), a third resistor R3, a buzzer, a fourth resistor R4, and a metal oxide semiconductor field effect transistor (MOSFET) Q1. The pressure sensor S1 senses the pressure of the battery pack 200 and the temperature sensor S2 senses the internal temperature of the battery pack 200. Respective signals sensed by the pressure sensor S1 and the temperature sensor S2 pass through the resistors R1 and R2 and the first and second diodes D1 and D2, respectively. The LED is connected to the first and second diodes D1 and D2 and to resistor R3. Resistor R3 is connected between the LED and ground. The buzzer is connected to diodes D1 and D2 and to ground. The MOSFET Q1 gate is connected to diodes D1 and D2 and to resistor R4. Resister R4 is also connected to ground.

The operation of the aforementioned protective circuit is described as follows.

Figure 4:
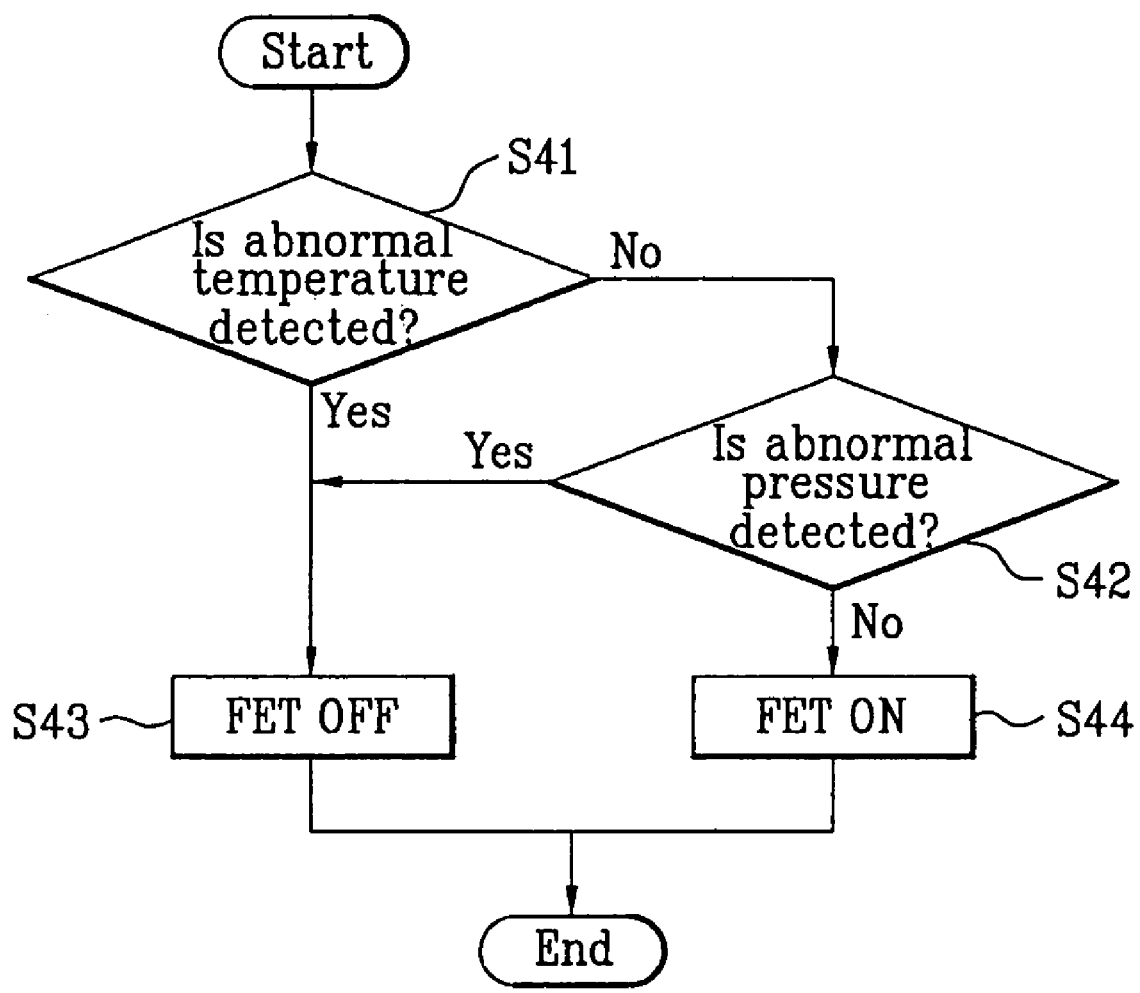
FIG. 4 is a flow chart illustrating the operation of a protective circuit according to one embodiment of the present invention.

The circuitry shown in FIG. 3 and the flow chart shown in FIG. 4 illustrate the operation of the protective circuit according to one embodiment of the present invention. A signal of the pressure sensor S1 detecting whether the pressure of the battery pack is normal is transmitted to the first diode D1 through the resistor R1. Likewise, a signal of the temperature sensor S2 detecting whether the temperature of the battery pack is normal is transmitted to the second diode D2 through the resistor R2.

The MOSFET Q1 is conducting when the gate is held low. In the case of normal conditions for both battery temperature and battery pressure, sensors S1 and S2 do not supply voltage to R1, R2 and D1, D2 respectively thereby biasing the Q1 gate to a low level turning on Q1 and supplying power from the battery 200 to the external circuitry 400.

If a pressure higher than a threshold pressure is detected in step S42, S1 provides a voltage to R1 and D1 thereby biasing the transistor Q1 gate to a high level and turning off Q1 as shown in step S44. Transistor Q1 disconnects power from the battery 200 to the external circuitry 400. Alternatively, if a temperature higher than a threshold temperature is detected in step S41, S2 provides a voltage through R2 and D2 to bias the transistor Q1 gate high thereby turning off transistor Q1, step S43, and disconnecting the battery 200 from the external circuitry 400.

When a high pressure or temperature condition is detected, the transistor Q1 gate is biased high by voltage supplied by either sensor S1 or S2. This voltage also actuates the buzzer and provides voltage to turn on the LED thereby providing both an audible and a visual indication of the alarm condition.

As described above, the terminal and the terminal battery pack according to the present invention have the following advantages.

In the terminal of the present invention, if the battery pack is in an alarm condition due to high temperature or pressure, the battery power is disconnected from the terminal circuitry thereby protecting the terminal circuitry and the user from danger.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A battery pack for a wireless communication terminal comprising:
    at least one battery cell; and
    a protective circuit comprising a means for disconnecting power from the battery pack to the wireless communication terminal, wherein the means for disconnecting is responsive to an alarm condition of the at least one battery cell,
    wherein the means for disconnecting comprises a metal oxide semiconductor field effect transistor (MOSFET) having a gate electrode,
    wherein the protective circuit further comprises a temperature sensor configured to detect a temperature of the at least one battery cell, a pressure sensor configured to detect a pressure of the at least one battery cell and an indicator component configured to indicate the alarm condition,
    wherein the temperature sensor is connected in series with a first diode and the pressure sensor is connected in series with a second diode, wherein the first and second diodes and the indicator component are connected directly to a single node connected to the gate electrode of the MOSFET,
    wherein the MOSFET turns off and the indicator component turns on when either the temperature sensor or the pressure sensor detects the alarm condition.

2. The battery pack of claim 1, wherein the temperature sensor detects the alarm condition when the temperature of the at least one battery cell is greater than a threshold temperature.

3. The battery pack of claim 1, wherein the pressure sensor detects the alarm condition when the pressure of the at least one battery cell is greater than a threshold pressure.

4. The battery pack of claim 1, wherein said indicator component provides a visual indication of the alarm condition.

5. The battery pack of claim 1, wherein the indicator component is a light emitting diode.

6. The battery pack of claim 1, wherein said indicator component provides an audible indication of the alarm condition.

7. A wireless communication terminal comprising:
    a battery pack for supplying power to the wireless communication terminal; and
    terminal body having circuitry for performing wireless communications,
    wherein the battery pack further includes at least one battery cell and a protective circuit,
    wherein the protective circuit comprises a means for disconnecting power from the battery pack to the wireless communication terminal responsive to an alarm condition of the battery pack,
    wherein the means for disconnecting comprises a metal oxide semiconductor field effect transistor (MOSFET) having a gate electrode,
    wherein the protective circuit further comprises a temperature sensor configured to detect a temperature of the at least one batter cell, a pressure sensor configured to detect a pressure of the at least one battery cell and an indicator component configured to indicate the alarm condition,
    wherein the temperature sensor is connected in series with a first diode and the pressure sensor is connected in series with a second diode, wherein the first and second diodes and the indicator component are connected directly to a single node connected to the gate electrode of the MOSFET, wherein the MOSFET turns off and the indicator component turns on when either the temperature sensor or the pressure sensor detects the alarm condition.

8. The terminal of claim 7, wherein the temperature sensor detects the alarm condition when the temperature of the at least one battery cell is greater than a threshold temperature.

9. The terminal of claim 7, wherein the pressure sensor detects the alarm condition when the pressure of the at least one battery cell is greater than a threshold pressure.

10. The terminal of claim 7, wherein said indicator component provides a visual indication of the alarm condition.

11. The terminal of claim 10, wherein the indicator component is a light emitting diode.

12. The terminal of claim 7, wherein said indicator component provides an audible indication of the alarm condition.

13. A method for protecting a battery pack of a wireless communication terminal, the method comprising:
providing a protective circuit comprising a metal oxide semiconductor field effect transistor (MOSFET having a gate electrode coupled to a temperature sensor to detect a temperature of at least one battery cell, a pressure sensor to detect a pressure of the at least one battery cell and an indicator component;
detecting an alarm condition of the battery pack using the temperature sensor and the pressure sensor, wherein the battery pack comprises the at least one battery cell;
disconnecting power from the battery pack to the wireless communication terminal in response to the al rm condition by providing a high level voltage to the gate electrode to turn off the MOSFET; and
turning on said indicator component in response to the alarm condition,
wherein the temperature sensor is connected in series with a first diode and the pressure sensor is connected in series with a second diode,
wherein the first and second diodes and the indicator component are connected directly to a single node connected to the gate electrode of the MOSFET.

14. The method of claim 13, wherein the temperature sensor detects the alarm condition when the temperature of the at least one battery cell is greater than a threshold temperature.

15. The method of claim 13, wherein the pressure sensor detects the alarm condition when the pressure of the at least one battery cell is greater than a threshold pressure.

16. The method of claim 13, wherein said indicator component provides a visual indication of the a arm condition.

17. The method of claim 16, wherein the indicator component is a light emitting diode.

18. The method of claim 13, wherein said indicator component provides an audible indication of the alarm condition.

19. The method of claim 1, wherein the indicator component comprises a visual indicator connected in parallel to an audible indicator.

* * * * *